(12) United States Patent
Chuang et al.

(10) Patent No.: US 11,392,178 B2
(45) Date of Patent: Jul. 19, 2022

(54) LOCKING HINGES

(71) Applicant: HEWLETT-PACKARD DEVELOPMENT COMPANY, L.P., Spring, TX (US)

(72) Inventors: Po-Feng Chuang, Taipei (TW); Kun-Hung Lin, Taipei (TW); Shih-Hua Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 32 days.

(21) Appl. No.: 16/481,862

(22) PCT Filed: Apr. 10, 2018

(86) PCT No.: PCT/US2018/026907
§ 371 (c)(1),
(2) Date: Jul. 30, 2019

(87) PCT Pub. No.: WO2019/199284
PCT Pub. Date: Oct. 17, 2019

(65) Prior Publication Data
US 2021/0405710 A1 Dec. 30, 2021

(51) Int. Cl.
*G06F 1/16* (2006.01)
(52) U.S. Cl.
CPC .......... *G06F 1/1681* (2013.01); *G06F 1/1679* (2013.01)
(58) Field of Classification Search
CPC ..... G06F 1/1677; G06F 1/1679; G06F 1/1681
See application file for complete search history.

(56) References Cited

U.S. PATENT DOCUMENTS

| 5,347,425 | A | 9/1994 | Herron et al. |
| 5,987,704 | A | 11/1999 | Tang |
| 8,228,299 | B1 | 7/2012 | Maloney et al. |
| 8,413,302 | B2 | 4/2013 | Kitagawa et al. |
| 8,418,917 | B1 | 4/2013 | Lewis et al. |
| 9,612,626 | B2 * | 4/2017 | Onda ................. G06F 1/1681 |
| 9,823,631 | B1 * | 11/2017 | Loo .................... G05B 15/02 |
| 10,133,315 | B2 * | 11/2018 | Gault ................. E05B 47/0001 |
| 10,551,880 | B1 * | 2/2020 | Ai ..................... H04M 1/0216 |
| 2008/0150458 | A1 | 6/2008 | Ryynanen et al. |
| 2010/0077810 | A1 | 4/2010 | De Franceschi |
| 2014/0098474 | A1 * | 4/2014 | Bhowmik .......... H04M 1/0216 |
| | | | 361/679.01 |
| 2018/0039250 | A1 * | 2/2018 | Liang ................. G06F 1/1681 |

FOREIGN PATENT DOCUMENTS

CN 101598935 3/2012

* cited by examiner

*Primary Examiner* — Anthony Q Edwards
(74) *Attorney, Agent, or Firm* — Rahman LLC

(57) ABSTRACT

An example electronic device includes a display screen, a first sensor on the display screen to transmit a first signal upon being contacted, a controller to receive the first signal and transmit a second signal in response to receiving the first signal, a motor to receive the second signal to trigger an actuation motion, a hinge connected to the display screen and comprising a first locking mechanism, and a second locking mechanism aligned with the first locking mechanism. The second locking mechanism is triggered by the actuation motion of the motor, and the triggering of the second locking mechanism is to activate the first locking mechanism to control movement of the hinge and the display screen.

20 Claims, 14 Drawing Sheets

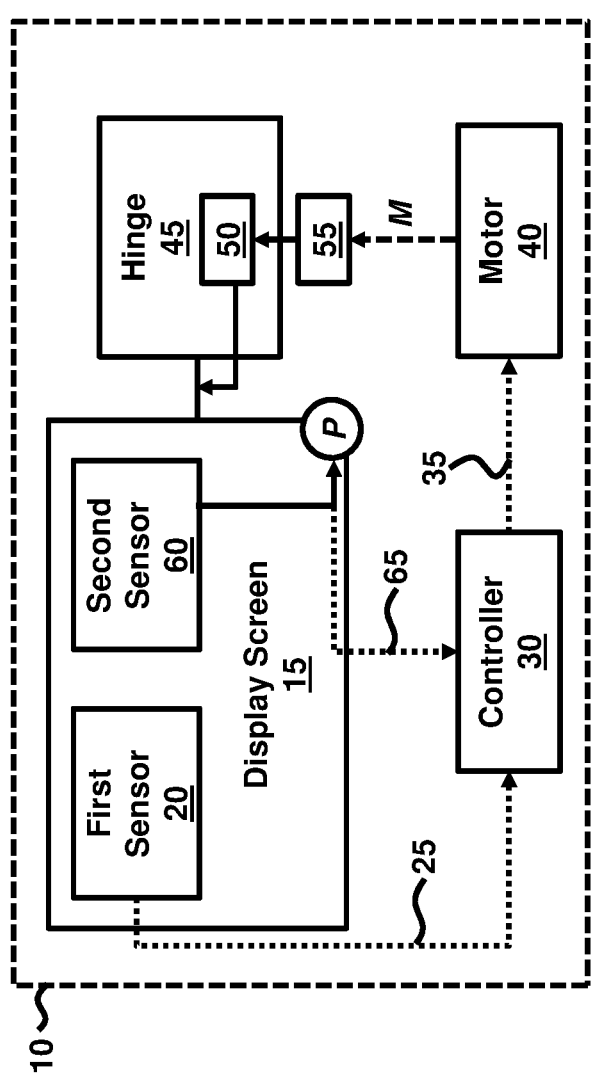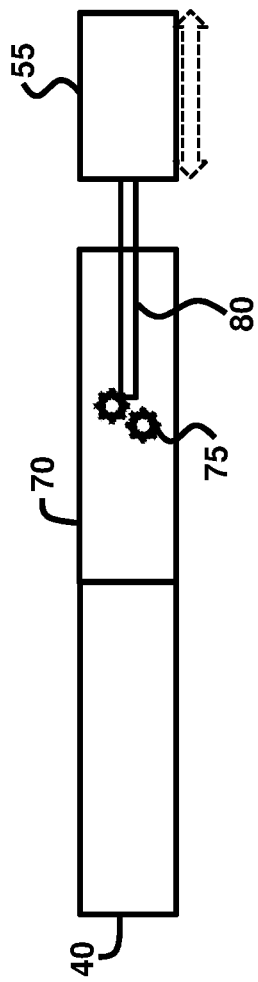

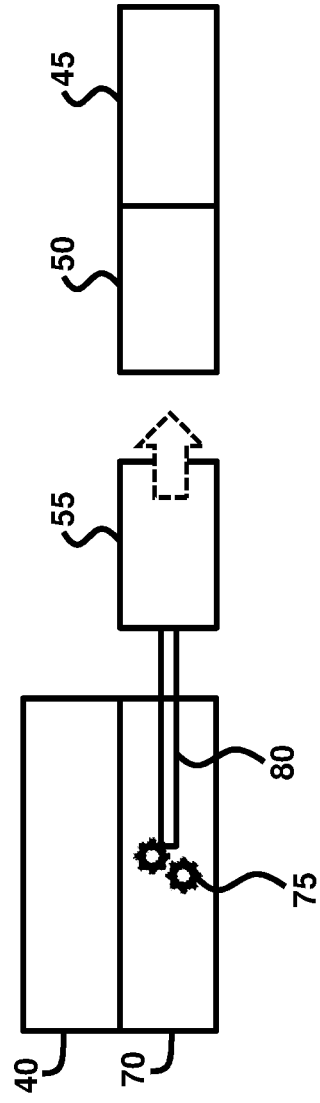
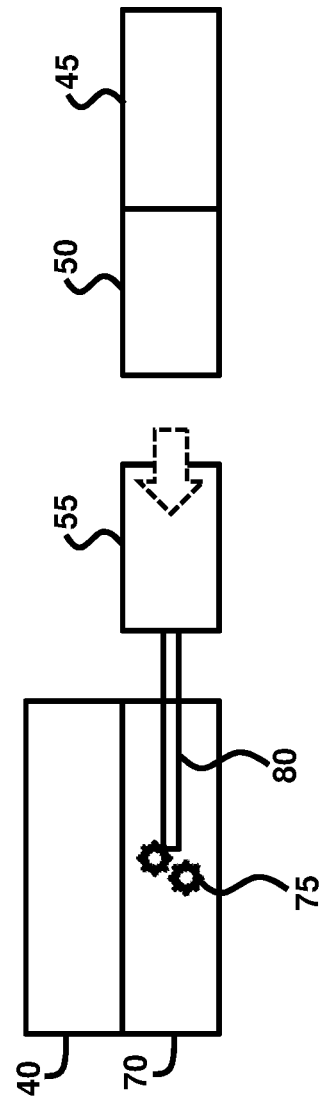

LOCKING HINGES

BACKGROUND

Portable electronic devices include such devices as laptop computers. Laptop computers are provided to allow for a compact footprint in computing. Laptop computers contain a display screen and a chassis with an attached keyboard.

BRIEF DESCRIPTION OF THE DRAWINGS

The following detailed description references the drawings, in which:

FIG. 2 is a block diagram illustrating the electronic device of FIG. 1 with multiple sensors, according to an example.

FIG. 3 is a block diagram illustrating the motor of the electronic device of FIG. 1 connected to a gearbox containing gears, according to an example.

FIG. 4A is a block diagram illustrating the actuation motion of the motor of FIG. 4 triggering movement of the second locking mechanism towards the first locking mechanism, according to an example.

FIG. 4B is a block diagram illustrating the actuation motion of the motor of FIG. 4 triggering movement of the second locking mechanism away from the first locking mechanism, according to an example.

Figure 1:
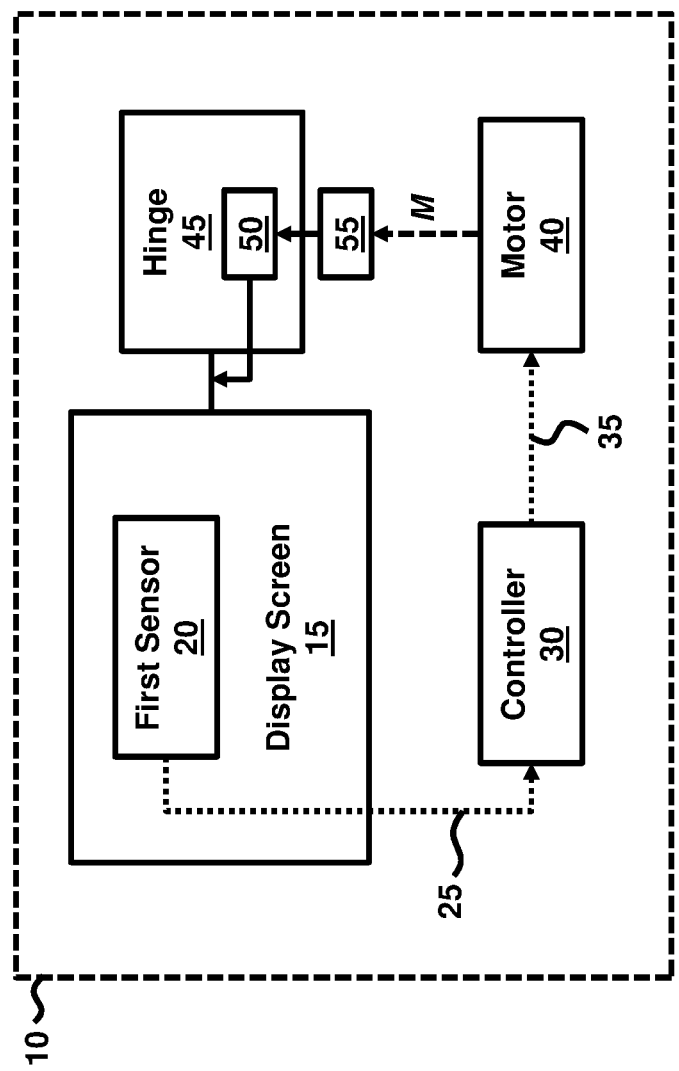
FIG. 1 is a block diagram illustrating an electronic device containing locking mechanisms for controlling movement of a display screen, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Various types of electronic devices may have a display screen rotatably connected to a chassis portion of the device. A laptop computer is a well-known example of such a device. Typically, when laptop computers are opened a user holds the chassis portion of the computer with one hand and then rotates the display screen portion into a viewing position with the other hand. In some applications a user may desire to open the laptop computer with one hand only, particularly in situations where a user's other hand is occupied or unavailable. Attempting to use one hand often results in an uneven motion with inexact control of the motion and ultimate viewing angle of the display screen. Display screens are often connected to the chassis portion of the laptop computer using hinges. These hinges typically only provide a mechanical connection functionality to allow the display screen to rotate with respect to the chassis portion. However, once opened, the display screen often vibrates particularly when the laptop is being used in mobile settings such as in automobiles, airplanes, and other moving vehicles, or if the laptop computer is placed on any type of machine that is generating vibrations onto the laptop computer. These vibrations, also referred to as wobbles in the industry, may cause some problems. For example, a vibrating display screen not only cause difficulty for a user to properly view the contents being displayed on the screen, but it can also create unwanted and potentially damaging vibrational effects on the display screen by loosening or otherwise damaging structural components contained on or in the display screen. Furthermore, a hinge with a high torque can typically provide vibration control, but cannot achieve a one hand open function. Conversely, a hinge with a low torque can typically achieve a one hand open function, but cannot provide vibration control.

In order to address this, an example provides a motorized hinge system for opening/closing a laptop screen. The system includes a sensor, controller, hinge, motor and gear box, and a braking module, which acts as a lock. The laptop includes a sensor on the front and back of the screen to detect the presence of a user's hand. The sensor transmits a signal to a controller indicating that a user's hand is in position to either open/close the laptop. The controller knows whether the laptop is to be opened or closed based on the current position of the laptop screen. For example, if the laptop screen is closed and the user's hand touches the sensor, then the controller knows that the laptop is to be opened, and vice versa. A hinge is provided to connect the screen portion of the laptop with the chassis. The motor is also communicatively linked to the controller and actuates the braking module. The braking module includes two brake components. The hinge attaches to a first brake, and the motor attaches to a second brake. When the laptop is in a closed position, the first and second brake are connected to one another to lock the hinge. When the sensor senses the user's hand, the sensor transmits a signal to the controller, which transmits a signal to the motor to move, the motor causes the second brake to disconnect from the first brake thereby unlocking the hinge and allowing the laptop screen to open. The amount of torque required to open the laptop screen is reduced due to the motor and gear box that assists in the rotation of the hinge. Thus, a user only needs to use one hand to open the laptop. Another sensor; e.g., a gyroscope sensor, is used to detect when the opening angle of the laptop is between 0-30° and transmits a signal to the controller to disconnect the first brake from the second brake, thereby unlocking the hinge.

FIG. 1 illustrates an electronic device 10 comprising a display screen 15. According to some examples, the electronic device 10 may be a mobile electronic device, hand-held device, stationary device, or any other type of electronic device. In another example, the electronic device 10 may be a laptop computer. In examples, the display screen 15 may be a liquid-crystal display screen, a light-emitting diode screen, an electroluminescent display screen, a digital light processing screen, or any other type of suitable display screen or monitor. The electronic device 10 further comprises a first sensor 20 on the display screen 15 to transmit a first signal 25 upon being contacted. In some examples, the first sensor 20 may be a proximity sensor, touch sensor, optical sensor, pressure sensor, heat sensor, electronic sensor, push button, graphical user interface, accelerometer, infrared sensor, or any other type of sensing device, component, or mechanism capable of detecting a force, environmental parameter, signal, energy, or any other type of detectable element. For example, the first sensor 20 may detect a force being applied to the first sensor 20 by contact such that the first sensor 20 may be pre-set to have a minimum sensing threshold to sense when it has been contacted. According to some examples, the first signal 25 may be either a wireless or wired signal. Furthermore, the first signal 25 may be an electronic signal, optical signal, or magnetic signal, according to various examples. Additionally, the first signal 25 may be an analog or digital signal.

The electronic device 10 further comprises a controller 30 to receive the first signal 25 and transmit a second signal 35 in response to receiving the first signal 25. In some examples, the controller 30 may be a proportional integral and derivative controller, a central processing unit, microprocessor, hardware engine, hardware pipeline, and/or other hardware-enabled device including volatile and non-volatile memory components suitable for receiving and processing the first signal 25, generating and transmitting the second signal 35, and running software, firmware, or other computer-executable instructions programmed or transmitted to the controller 30. According to some examples, the second signal 35 may be either a wireless or wired signal. Furthermore, the second signal 35 may be an electronic signal, optical signal, or magnetic signal, according to various examples. Additionally, the second signal 35 may be an analog or digital signal. Based on the data included in the first signal 25 such as the duration of a force detected by the first sensor 20, the controller 30 generates and transmits an appropriate second signal 35. In some examples, the first signal 25 and the second signal 35 may be the same such that the controller 30 simply relays the first signal 25 without having to generate the second signal 35.

The electronic device 10 further comprises a motor 40 to receive the second signal 35 to trigger an actuation motion M. In some examples, the motor 40 may be an electric motor such as an AC or DC motor. Upon receiving the second signal 35 from the controller 30, the motor 40 begins to run. The actuation motion M may be the motion of internal components of the motor 40 or of connected components of the motor 40. The electronic device 10 also includes a hinge 45 connected to the display screen 15 and comprising a first locking mechanism 50. A second locking mechanism 55 aligned with the first locking mechanism 50.

According to an example, the hinge 45 may be a multi-component mechanism with the attached first locking mechanism 50. In other examples, the first locking mechanism 50 may be operatively connected to the hinge 45. Furthermore, the hinge 45 may comprise any suitable size or shape required or accommodated by the electronic device 10. Additionally, the hinge 45 may be made of metal or plastic components or a combination thereof, and as such, the hinge 45 may be a mechanical device, and electrical device, or an electromechanical device. The hinge 45 is set to provide rotational movement for at least one connected component. For example, the hinge 45 is operatively connected to the display screen 15 to allow the display screen 15 to rotate. In some examples, the hinge 45 itself is set to rotate to facilitate the corresponding rotation of the display screen 15. In such an example, the motor 40 may drive the rotation of the hinge 45.

The first locking mechanism 50 and second locking mechanism 55 may also comprise any suitable size or shape required or accommodated by the electronic device 10. In an example, the first locking mechanism 50 and the second locking mechanism 55 may be arranged as braking components or bumpers that are set to control the movement of the hinge 45 through applied mechanical forces such as frictional forces. In other examples, the first locking mechanism 50 and the second locking mechanism 55 may be electronic or electromagnetic devices that control the movement of the hinge 45 through applied electronic, magnetic, or electromagnetic signals, which may be wired or wireless signals, that enable and/or disable the rotational movement of the hinge 45.

The second locking mechanism 55 is triggered by the actuation motion M of the motor 40. In this regard, the motor 40 may transmit power to the second locking mechanism 55 to enable the second locking mechanism 55 to become triggered, and in an example, causes the second locking mechanism 55 to move. The triggering of the second locking mechanism 55 activates the first locking mechanism 50 to control movement of the hinge 45 and the display screen 15. For example, once the motor 40 actuates and triggers the second locking mechanism 55, then the second locking mechanism 55 actuates the first locking mechanism 50, which is attached to or operatively connected to the hinge 45 in order to control the movement of the hinge 45; e.g., the rotational movement of the hinge 45, etc.

As shown in FIG. 2, with reference to FIG. 1, the electronic device 10 may comprise a second sensor 60 on the display screen 15 to detect a position P of the display screen 15 and transmit a third signal 65 to the controller 30 to control the actuation motion M of the motor 40. In an example, the second sensor 60 may comprise a gyroscope that is capable of measuring an orientation of the display screen 15; e.g., the position P. According to an example, the position P may comprise the angle of orientation; e.g., viewing angle, of the display screen 15. The data associated with the position P is transmitted in the third signal 65 to the controller 30. According to some examples, the third signal 65 may be either a wireless or wired signal. Furthermore, the third signal 65 may be an electronic signal, optical signal, or magnetic signal, according to various examples. Additionally, the third signal 65 may be an analog or digital signal. Based on the data included in the third signal 65 related to the position P of the display screen 15, the controller 30 generates and transmits the second signal 35 to the motor 40. In this regard, the second signal 35 may include the data associated with the first signal 25 and the third signal 65, or the second signal 35 may only include the data associated with the third signal 65. The position P of the display screen 15 may dictate the amount of rotation, if any, of the hinge 45.

As shown in FIG. 3, with reference to FIGS. 1 and 2, the electronic device 10 may comprise a gearbox 70 connected to the motor 40. In an example, the gearbox 70 may comprise any suitable size or shape required or accommodated by the electronic device 10, and may be appropriately selected based on the parameters dictated by the motor 40, such as power generation, etc. The gearbox 70 comprises gears 75 to rotate a shaft 80 causing the second locking mechanism 55 to translate with respect to the motor 40. The gears 75 may be set in any suitable arrangement to facilitate the transfer of motion from one position or type to another position or type; i.e., angular motion in a first plane into angular motion in a second plane.

In an example, the motor 40, gearbox 70, shaft 80, second locking mechanism 55, first locking mechanism 50, and hinge 45 may be linearly aligned. For example, the shaft 80 may be operatively connected to the gears 75 and the second locking mechanism 55 such that when the shaft 80 is actuated by the movement of the gears 75, then the shaft 80 triggers the translational motion of the second locking mechanism 55 with respect to the motor 40.

Accordingly, the second locking mechanism 55 move linearly with respect to the first locking mechanism 50. As such, the first locking mechanism 50 may be fixed with respect to the hinge 45, but the second locking mechanism 55 may be enabled to move. As shown in FIG. 4A, with reference to FIGS. 1 through 3, the actuation motion M of the motor 40 is to trigger the second locking mechanism 55 to move linearly towards the first locking mechanism 50 to lock the hinge 45. Accordingly, when the second locking mechanism 55 contacts or otherwise connects with the first locking mechanism 50, then the hinge 45 is locked in position, and does not rotate. Thus, the display screen 15 is similarly locked in whatever position it is currently in and does not rotate. Moreover, as shown in FIG. 4B, with reference to FIGS. 1 through 4A, the actuation motion M of the motor 40 is to trigger the second locking mechanism 55 to move linearly away from the first locking mechanism 50 to unlock the hinge 45. Accordingly, when the second locking mechanism 55 does not contact or otherwise becomes disconnected from the first locking mechanism 50, then the hinge 45 is unlocked, and is enabled to rotate. Thus, the display screen 15 is similarly unlocked and is enabled to rotate.

Figure 5:
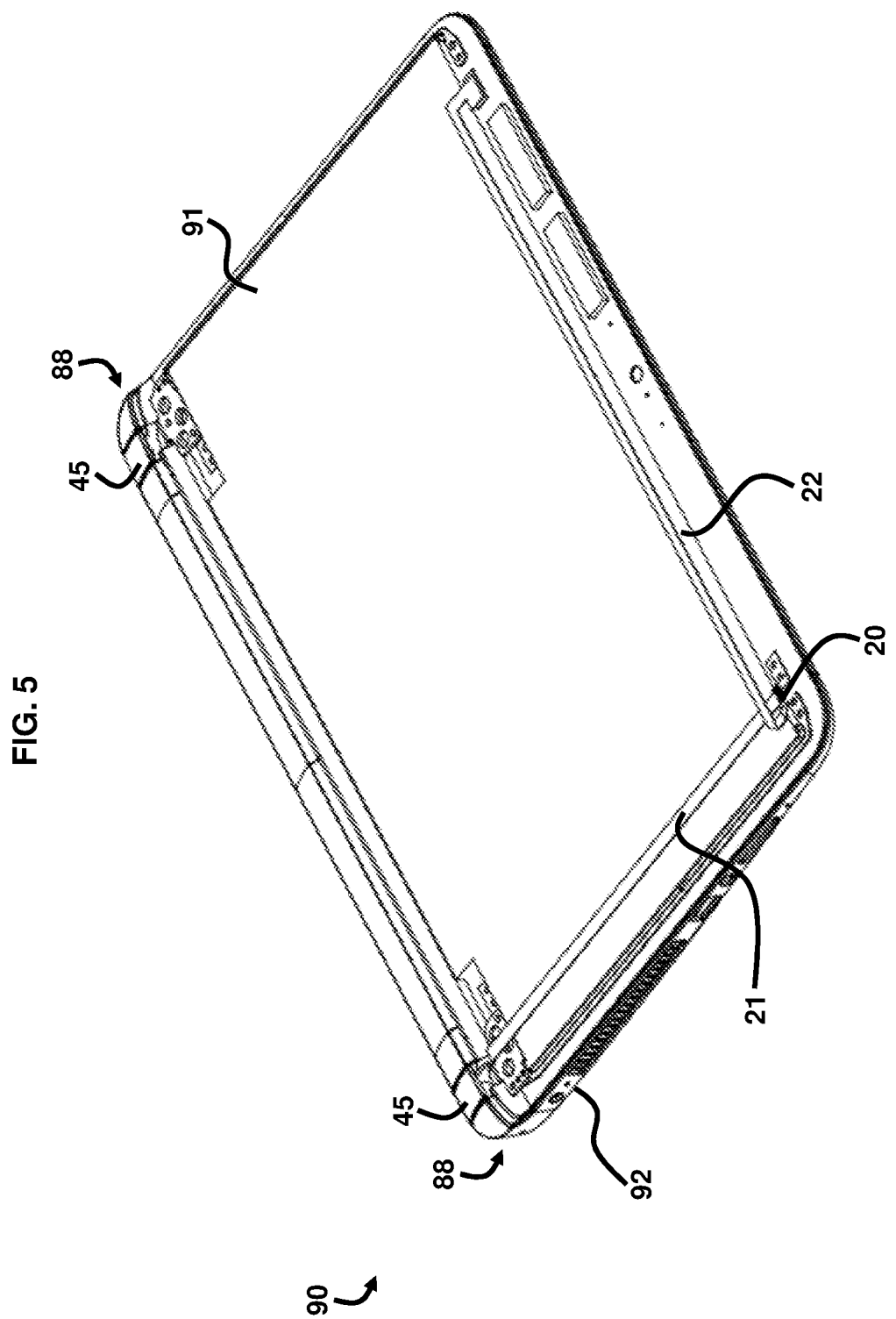
FIG. 5 is a schematic diagram of a laptop computer in a closed position with a sensor, according to an example.

FIG. 5, with reference to FIGS. 1 through 4B, is a schematic diagram of a laptop computer 90 in a closed position with a first sensor 20, according to an example. The laptop computer 90 comprises a frame 91 that holds the display screen 15, which is not shown in FIG. 5. The chassis 92 of the laptop computer 90 is rotatably connected to the frame 91 by the hinge 45. As shown in FIG. 5, the laptop computer 90 comprises hinges 45, which may be provided in pairs positioned on opposite ends 88 of the frame 91, according to an example. However, the laptop computer 90 may contain only one hinge 45 in an example, or may have more than two hinges 45 in other examples. The first sensor 20 is operatively connected to a sensor cable 21. In an example, the sensor cable 21 is provided to transmit the first signal 25 from the first sensor 20 to the controller 30, which is not shown in FIG. 5, but which may be positioned in the chassis 92. In another example, the first sensor cable 21 is not provided and the first signal 25 may be wirelessly transmitted to the controller 30. The first sensor 20 may also be operatively connected to an antenna 22 to allow mobile communication through a wireless local area network or wireless wide area network, for example.

Figure 6:
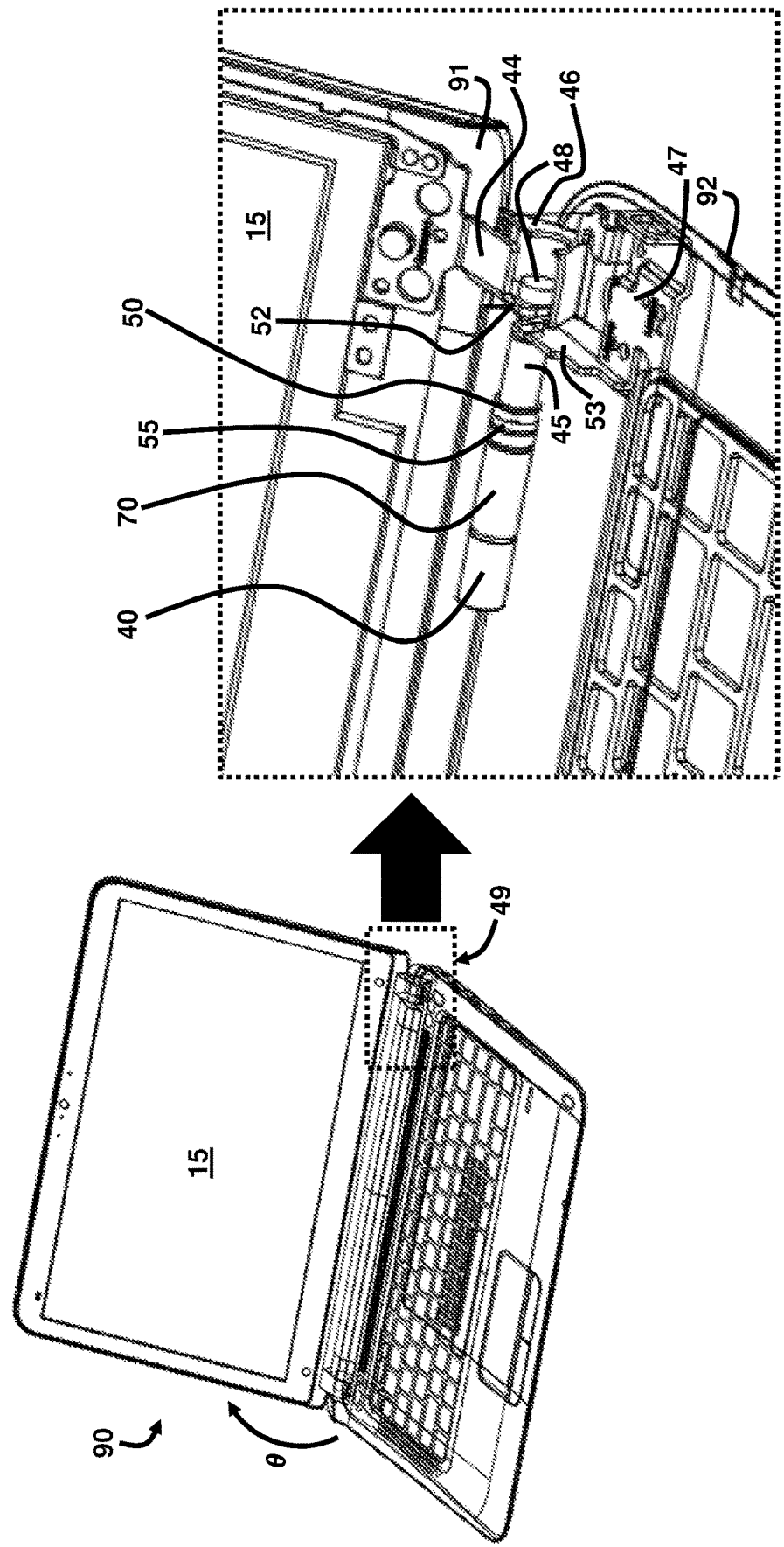
FIG. 6 is a schematic diagram illustrating a perspective front view of a laptop computer in an open position with a locking hinge mechanism, according to an example.

FIG. 6, with reference to FIGS. 1 through 5, is a schematic diagram illustrating a perspective front view of a laptop computer 90 in an open position with a locking hinge mechanism 49, according to an example. The open position provides for the display screen 15 to be positioned at a particular viewing angle θ. The locking hinge mechanism 49 comprises the motor 40 operatively connected to the gearbox 70, the first locking mechanism 50, and the aligned second locking mechanism 55. In an example, the second locking mechanism 55 is operatively connected to a shaft 80, which is not shown in FIG. 6, but which is connected to the gearbox 70. The first locking mechanism 50 connects to the hinge 45. In an example, the chassis 92 of the laptop computer 90 comprises a holder 46 that accommodates an end cap 48 of the hinge 45. A first bracket 44 is attached to the frame 91 and a second bracket 47 is attached to the chassis 92. According to an example, the first bracket 44 comprises a first stem 52 that attaches to the end cap 48, and the second bracket 47 comprises a second stem 53 that attaches to the hinge 45. The first bracket 44, first stem 52, second bracket 47, and second stem 53 each have a surface area, thickness, and material properties to provide a sufficient damping strength for any vibration that the frame 91 experiences as a result of the laptop computer 90 being in the open position with the display screen 15 viewable. As shown in FIG. 6, according to an example, when the first locking mechanism 50 connects with the second locking mechanism 55, the rotational movement of the hinge 45 and end cap 48 stop, thus preventing the frame 91 from rotating with respect to the chassis 92 by way of the connected first and second brackets 44, 47, respectively.

Figure 7:
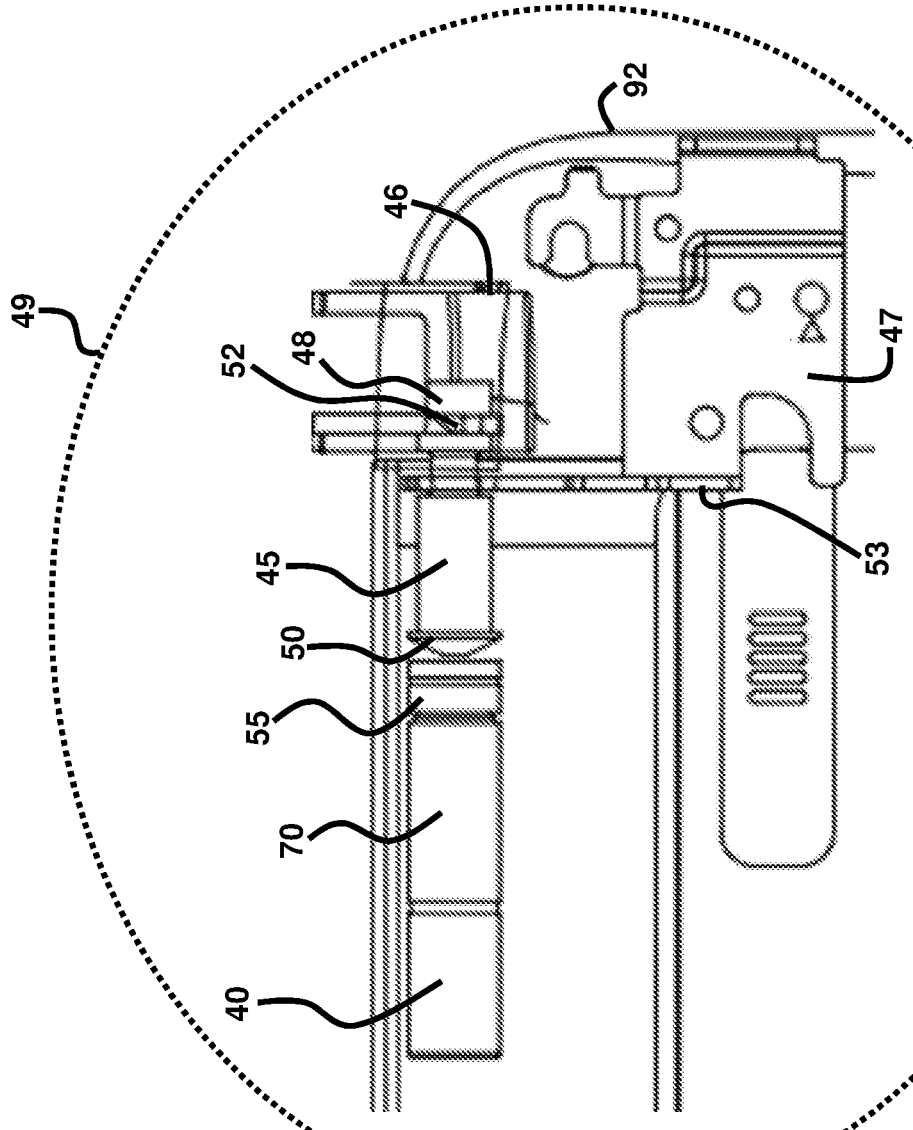
FIG. 7 is a schematic diagram illustrating an isolated view of the electronic device with a locking hinge mechanism in an unlocked configuration, according to an example.

FIG. 7, with reference to FIGS. 1 through 6, is a schematic diagram illustrating an isolated view of the locking hinge mechanism 49 in an unlocked configuration, according to an example. As shown in FIG. 7, the second locking mechanism 55 does not fully engage the first locking mechanism 50, which allows the hinge 45 to rotate. Moreover, when the first locking mechanism 50 is disconnected from the second locking mechanism 55, the rotational movement of the hinge 45 and end cap 48 are permitted, thus allowing the frame 91 to rotate with respect to the chassis 92 by way of the connected first and second brackets 44, 47, respectively.

Figure 8:
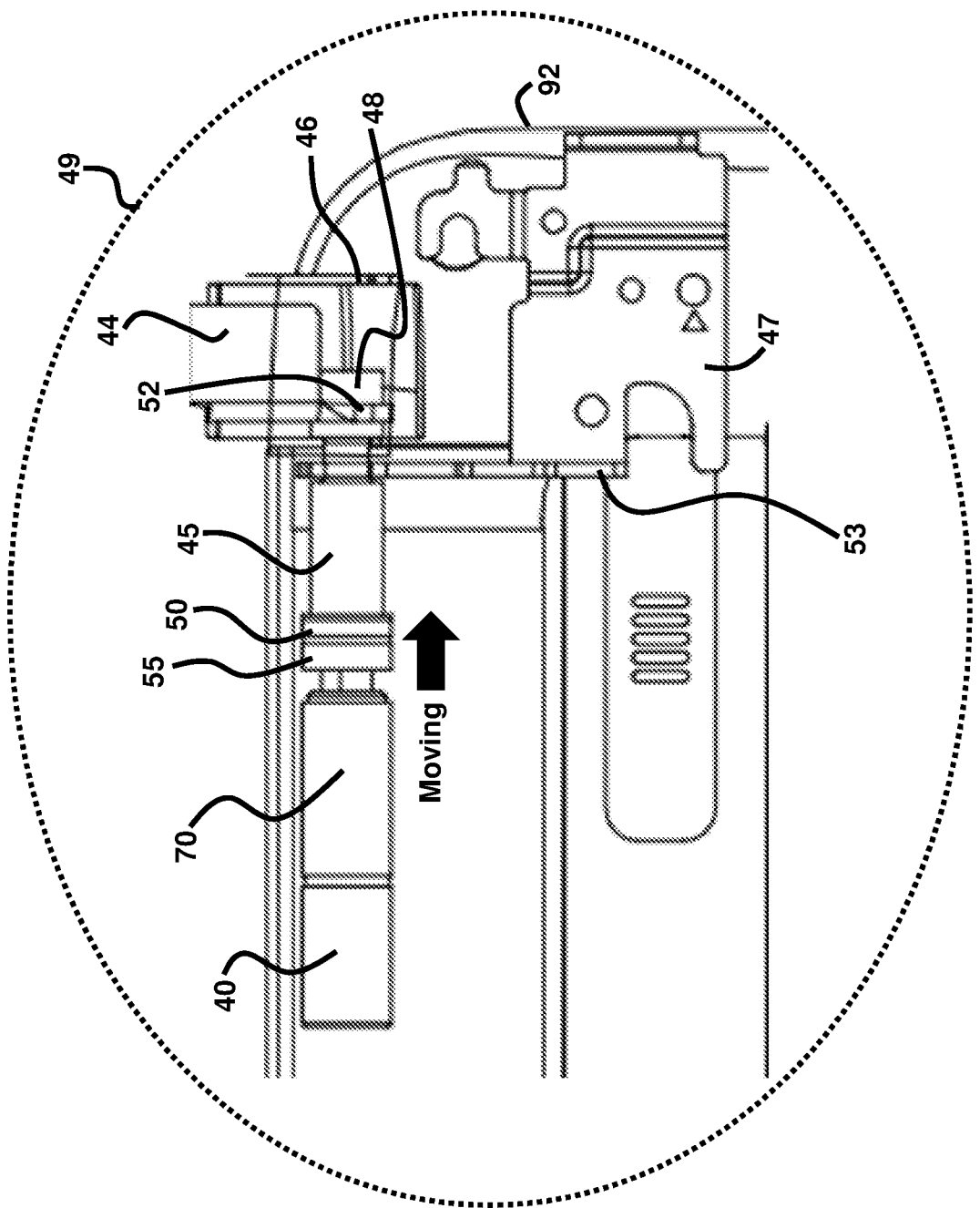
FIG. 8 is a schematic diagram illustrating an isolated view of the electronic device with a locking hinge mechanism transitioning into a locked configuration, according to an example.

FIG. 8, with reference to FIGS. 1 through 7, is a schematic diagram illustrating an isolated view of the locking hinge mechanism 49 transitioning into a locked configuration, according to an example. As indicated above, in FIG. 7, the first locking mechanism 50 and the second locking mechanism 55 are separated from one another, which allows the hinge 45 to rotate. In FIG. 8, as the second locking mechanism 55 moves toward the first locking mechanism 50, the hinge 45 is retained in position thereby preventing the hinge 45 from rotating. According, in an example, the first locking mechanism 50 is set in its position, and only the second locking mechanism 55 moves with respect to the first locking mechanism 50 in order to provide the connection between the first locking mechanism 50 and the second locking mechanism 55.

Figure 9:
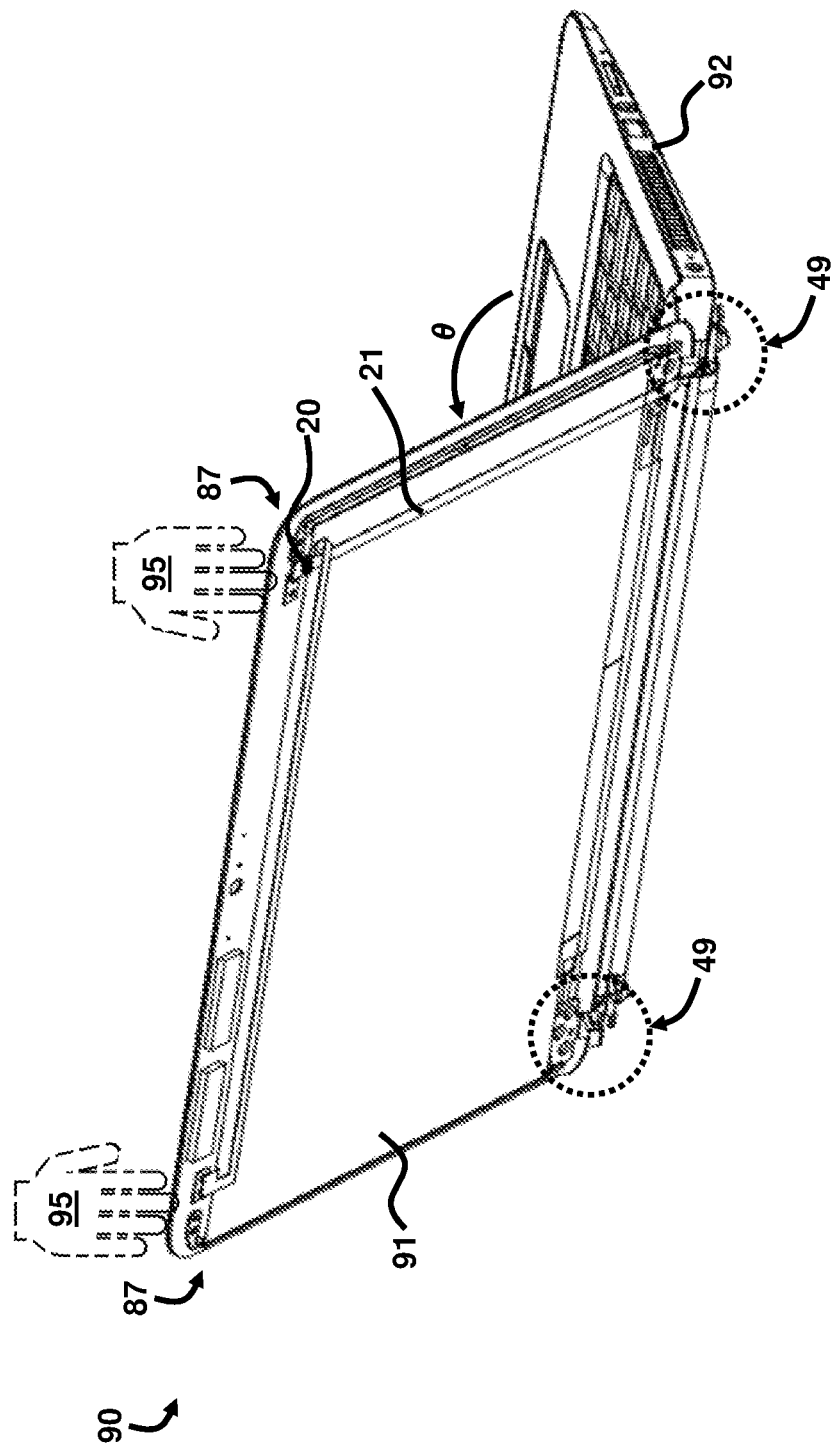
FIG. 9 is a schematic diagram illustrating a rear perspective view of a laptop computer in an open position with a first sensor, according to an example.

FIG. 9, with reference to FIGS. 1 through 8, is a schematic diagram illustrating a rear perspective view of a laptop computer 90 in an open position and at a particular angle θ. The first sensor 20 is shown with the connected first sensor cable 21, according to an example. The locking hinge mechanism 49 may be provided in pairs and are arranged in a substantially similar, yet mirrored configuration, according to an example. The first sensor cable 21 operatively connects to the controller 30, which is not shown in FIG. 9. The controller 30 may receive the first signal 25 from the first sensor 20 upon the first sensor 20 being contacted by a user; i.e., a user's hand 95, for example. As indicated in FIG. 9, the user's hand 95 is depicted on either end 87 of the frame 91 to represent that the first sensor 20 may be similarly positioned on either end 87 of the frame 91. Moreover, the actual positioning or direction of the user's hand 95 is not limited to any particular position or direction. So long as the user maintains contact with the first sensor 20, the controller 30 maintains control over the motor 40 to ensure the second locking mechanism 55 does not connect with the first locking mechanism 50. In an example, once the user removes contact with the first sensor 20, the first sensor 20 transmit the first signal 25 to the controller 30 to operate the motor 40, which in turn actuates the second locking mechanism 55 to connect with the first locking mechanism 50 in order to lock the hinge 45.

Figure 10:
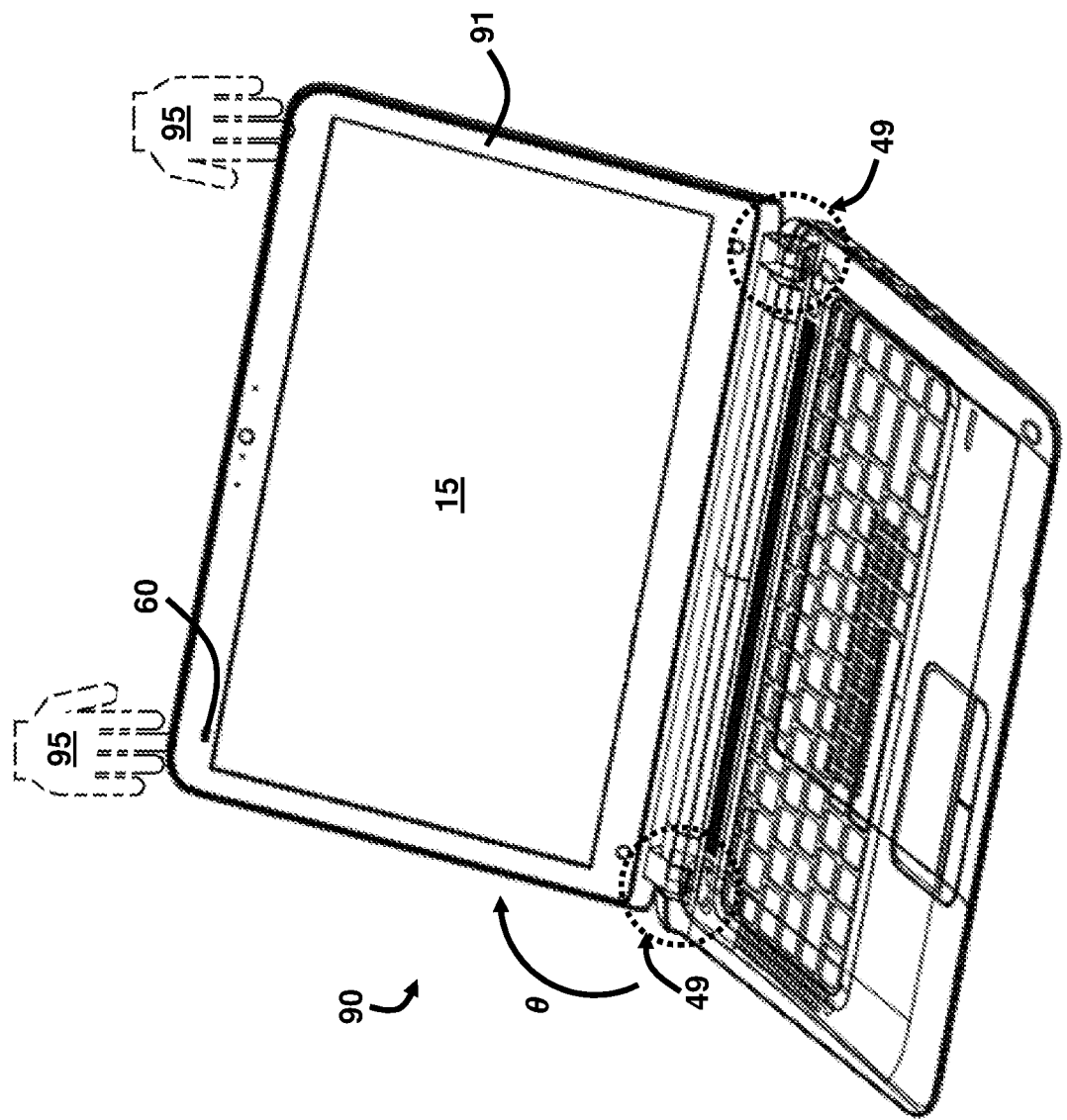
FIG. 10 is a schematic diagram illustrating a front perspective view of a laptop computer in an open position with a second sensor, according to an example.

FIG. 10, with reference to FIGS. 1 through 9, is a schematic diagram illustrating a front perspective view of a laptop computer 90 in an open position with a second sensor 60, according to an example. In an example, when a user contacts the first sensor 20 of the frame 91 of the laptop computer 90; e.g., with a hand 95, etc., the first sensor 20 transmits the first signal 25 to the controller 30. In another example, the first sensor 20 is an optical sensor such that the user does not have to make actual contact with the first sensor 20 in order for the first signal 25 to be transmitted to the controller 30 so long as the user's hand 95, etc., is proximate to the first sensor 20 or is detected by the optical components of the first sensor 20 in a suitable manner. Then, the controller 30 controls the operation of the motor 40 in order to pull the second locking mechanism 55 away from the first locking mechanism 50 to allow the hinge 45 to rotate, and thus allow the frame 91 to rotate with respect to the chassis 92. The second sensor 60 may be a gyroscope sensor, in an example, and transmits the third signal 65 to the controller 30 to instruct the second locking mechanism 55 to disconnect from the first locking mechanism 50. In an example, whenever the frame 91 is between 0-30° with respect to the chassis 92. Table 1 describes the various operations associated with the first sensor 20, second sensor 60, the motor 40, and the hinge 45 with respect to different angles θ of the frame 91 with respect to the chassis 92.

TABLE 1

Operations and viewing angles

| | Display screen angle θ | | |
|---|---|---|---|
| | 0-30° | >30° | |
| First sensor | Inactive | Active | |
| Second sensor | Active | Inactive | |
| Motor | Pull second locking mechanism apart from first locking mechanism | Hand engaging first sensor Pull second locking mechanism apart from first locking mechanism | Hand removed from first sensor Push second locking mechanism to connect to first locking mechanism |
| Hinge status | Unlocked | Unlocked | Locked |

Figure 11:
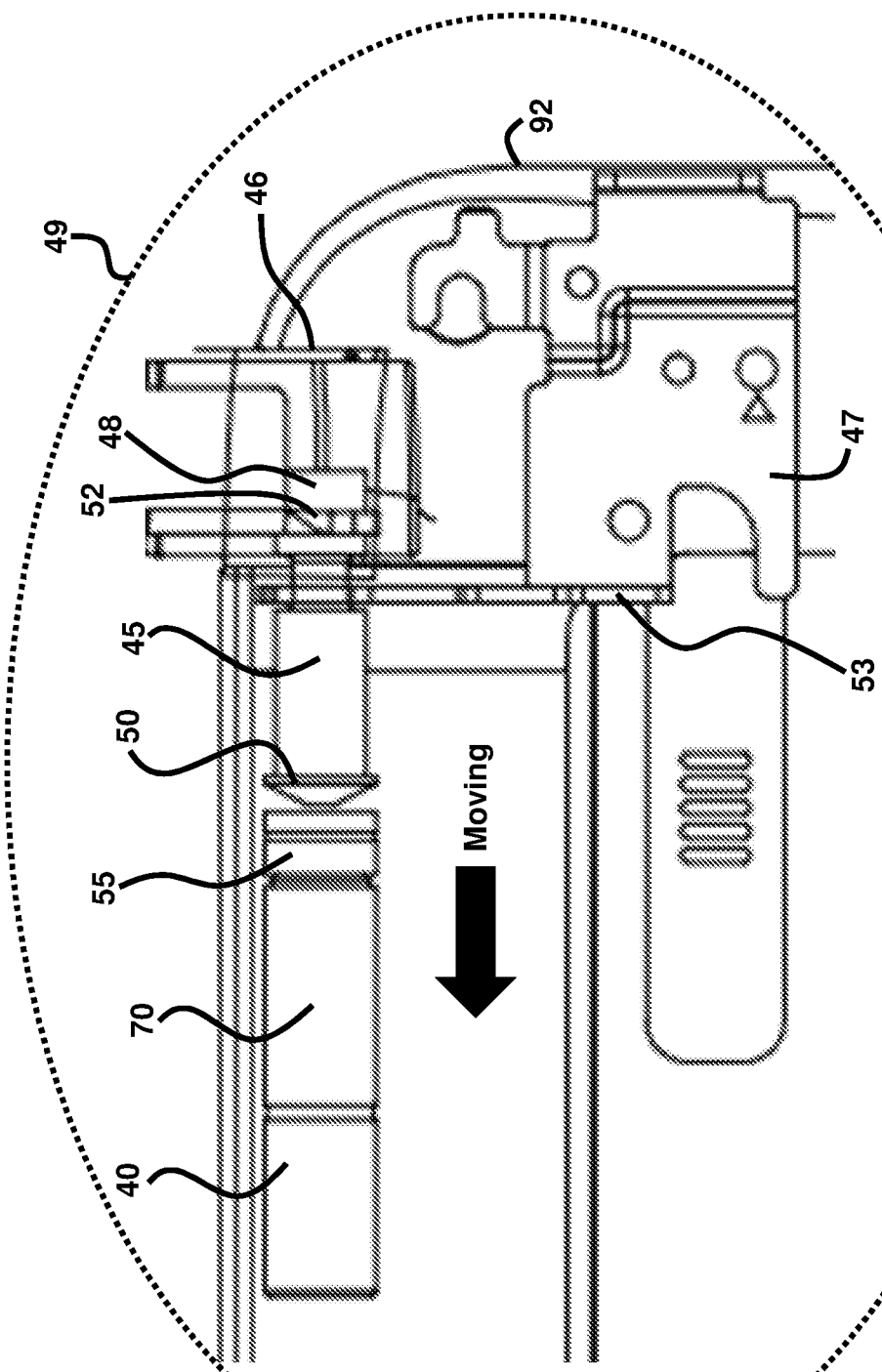
FIG. 11 is a schematic diagram illustrating a locking hinge mechanism transitioning into an unlocked configuration, according to an example.

FIG. 11, with reference to FIGS. 1 through 10, is a schematic diagram illustrating a locking hinge mechanism 49 transitioning into an unlocked configuration, according to an example. In FIG. 11, the second locking mechanism 55 is moving away from the first locking mechanism 50 causing a disconnection between the first locking mechanism 50 and the second locking mechanism 55. As such, the disconnection unlocks the hinge 45 enabling the hinge 45 to rotate, and accordingly permitting the frame 91 to rotate with respect to the chassis 92.

Figure 12:
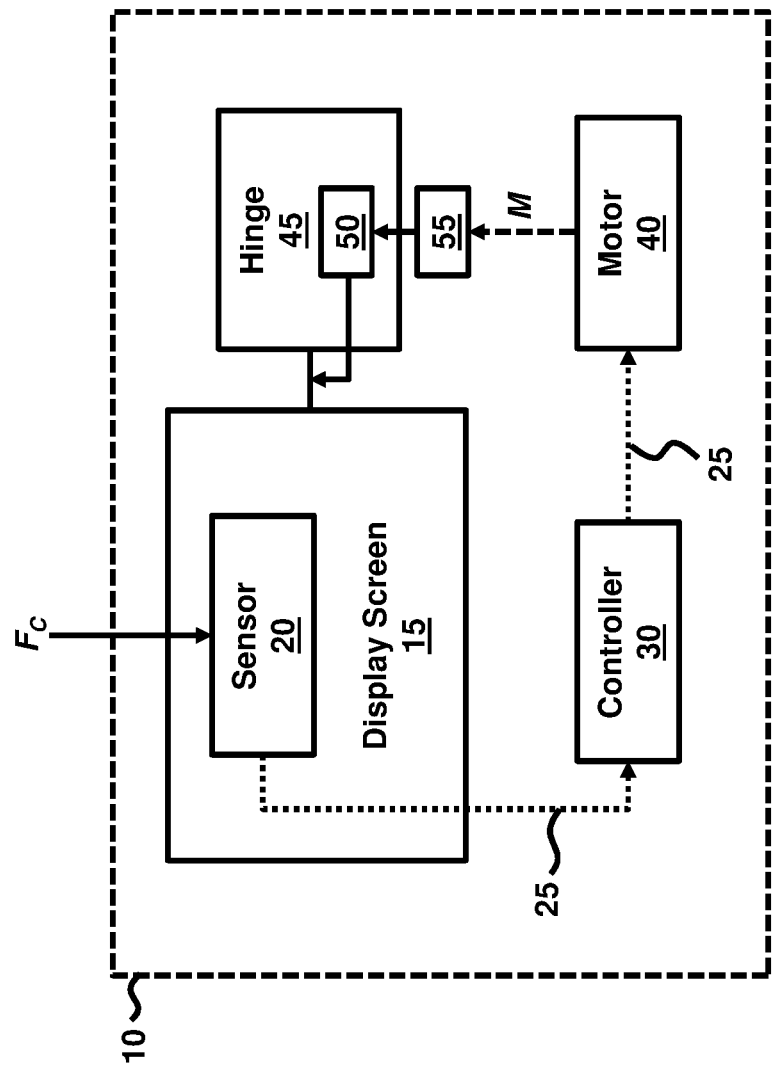
FIG. 12 is a block diagram illustrating an electronic device being actuated by a contact force, according to an example.

Another example is shown in FIG. 12, with reference to FIGS. 1 through 11. An electronic device 10 comprises a display screen 15, a sensor 20 on the display screen 15 to detect a contact force $F_C$ upon the sensor 20, a controller 30 communicatively linked to the sensor 20 to transmit a signal 25 upon determining that the sensor 20 detects the contact force $F_C$, a motor 40 communicatively linked to the controller 30 to move upon receiving the signal 25, a hinge 45 connected to the display screen 15, a first locking mechanism 50 to control a movement of the hinge 45, and a second locking mechanism 55 to engage the first locking mechanism 50 upon being triggered by a motion M of the motor 40. The engagement of the second locking mechanism 55 with the first locking mechanism 50 is to trigger the first locking mechanism 50 to lock the hinge 45. In this example, the sensor 20 may be a touch sensor that is set to detect the contact force $F_C$ applied upon the sensor 20. For example, the contact force $F_C$ may be applied by a user's hand 95.

Figure 13A:
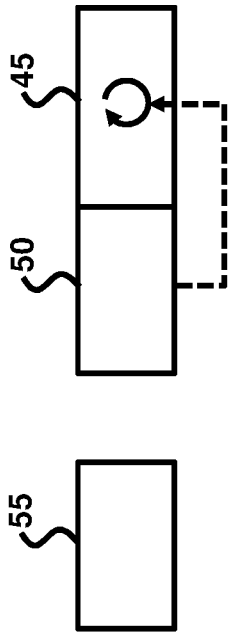
FIG. 13A is a block diagram illustrating a first locking mechanism controlling movement of the hinge of FIG. 12 by retaining the hinge in place, according to an example.
Figure 13B:
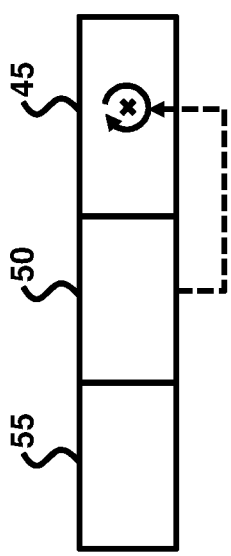
FIG. 13B is a block diagram illustrating a first locking mechanism controlling movement of the hinge of FIG. 12 by permitting the hinge to move, according to an example.

As shown in FIG. 13A, with reference to FIGS. 1 through 12, the first locking mechanism 50 is to control the movement of the hinge 45 by retaining the hinge 45 in place upon the second locking mechanism 55 being connected to the first locking mechanism 50. In an example, the Furthermore, as shown in FIG. 13B, with reference to FIGS. 1 through 13A, the first locking mechanism 50 is to control the movement of the hinge 45 by permitting the hinge 45 to rotate upon the second locking mechanism 55 disconnecting from the first locking mechanism 50.

Figure 14:
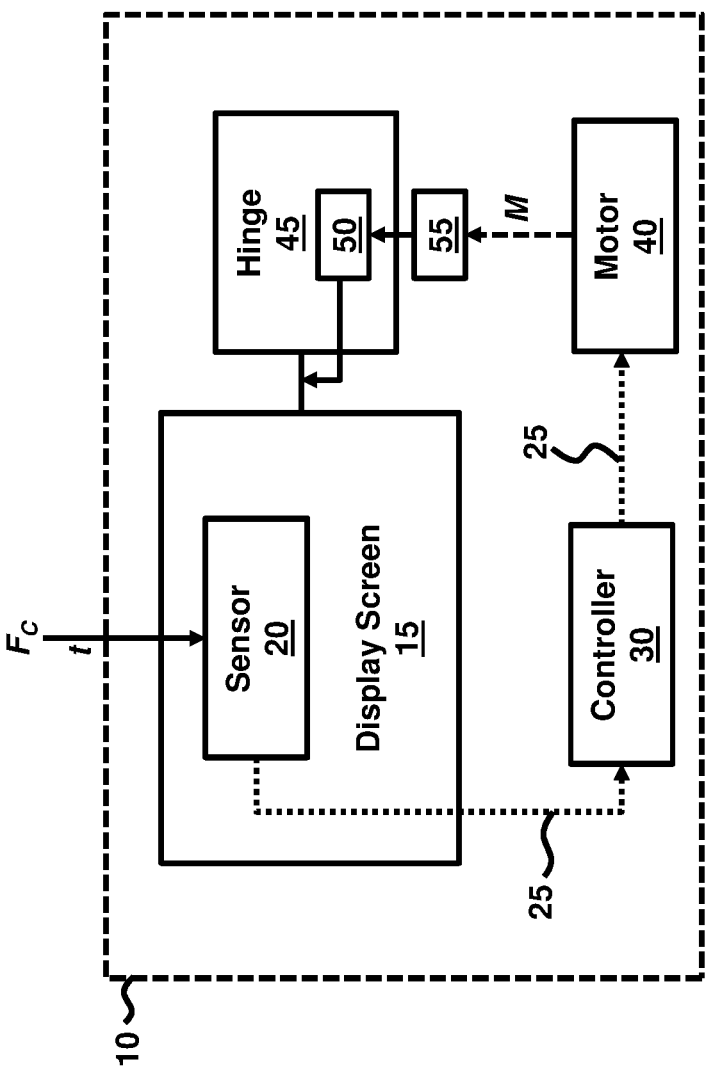
FIG. 14 is a block diagram illustrating the electronic device of FIG. 12 actuated by a contact force for a predetermined period of time, according to an example.

As shown in FIG. 14, with reference to FIGS. 1 through 13B, the contact force $F_C$ is to occur for a predetermined time t, which may be approximately one second, according to an example, to trigger the controller 30 to determine that the sensor 20 has detected the contact force $F_C$.

Figure 15:
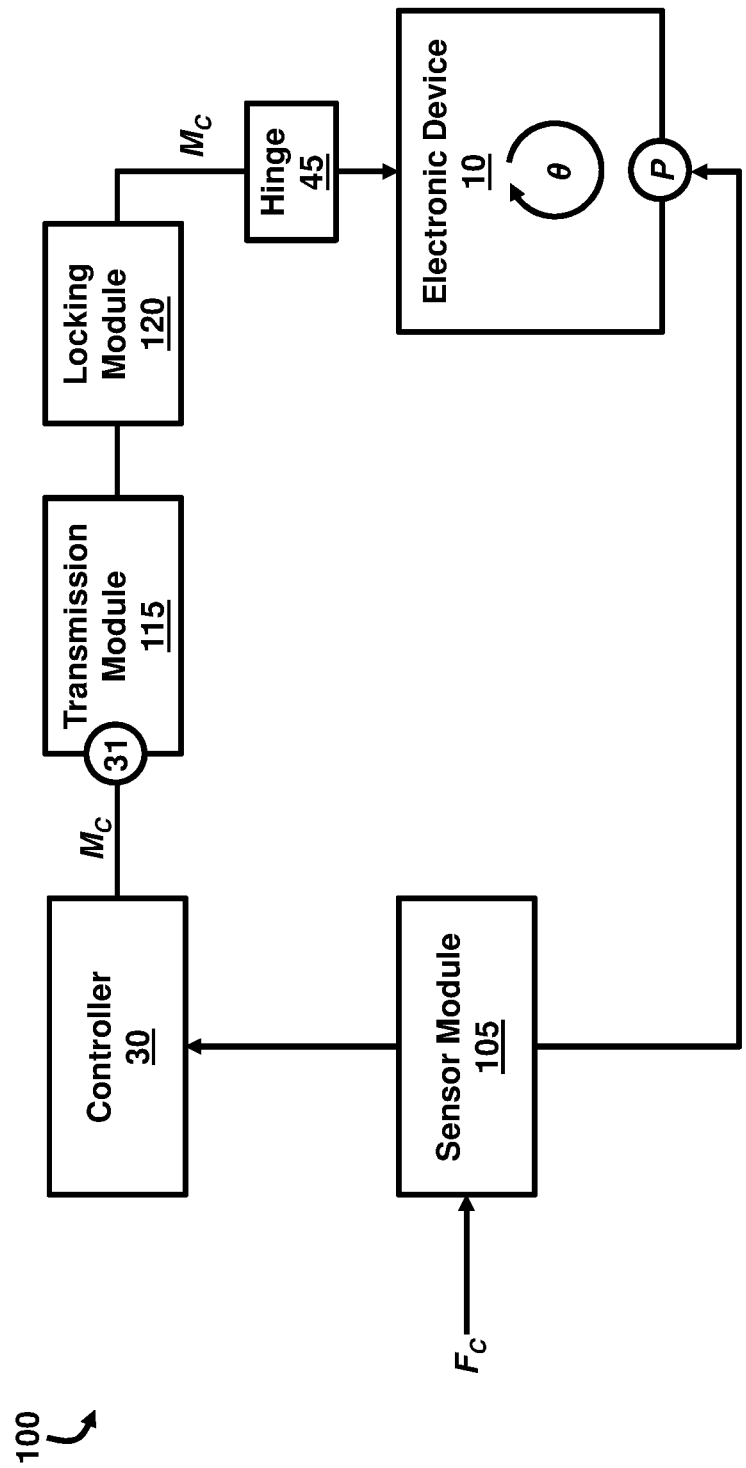
FIG. 15 is a block diagram illustrating a control system for controlling articulation of an electronic device with a dual component locking module, according to an example.

As shown in FIG. 15, with reference to FIGS. 1 through 14, a control system 100 comprising a sensor module 105 to detect a position P of an electronic device 10, and to transmit a signal 110 upon being contacted; e.g., by contact force $F_C$. The signal 110 may be either a wireless or wired signal. Furthermore, the signal 110 may be an electronic signal, optical signal, or magnetic signal, according to various examples. Additionally, the signal 110 may be an analog or digital signal. A controller 30 is provided to receive the signal 110 and initiate motion control $M_C$ of the electronic device 10. The motion control $M_C$ of the electronic device 10 may include controlling the angle θ that the electronic device 10 is positioned.

A transmission module 115 is provided to receive motion control instructions 31 from the controller 30 and become actuated. The actuation of the transmission module 115 may include transmission of signals, movement of associated components of the transmission module 115, or other forms of actuation. A hinge 45 is connected to the electronic device 10 to allow the electronic device 10 to articulate between different angles θ. In this regard, the electronic device 10 is set for different positions. A dual component locking module 120 is operatively connected to the transmission module 115 and the hinge 45 such that the dual component locking module 120 is to lock or unlock the hinge 45 to control articulation of the electronic device 10. Accordingly, the dual component locking module 120 contains multiple components to lock or unlock the hinge 45. The sensor module 105, transmission module 115, and dual component locking module 120 may be implemented by the controller 30 executing machine readable instructions stored in a memory, or a processor operating in accordance with instructions embedded in logic circuitry. The controller 30 may be a central processing unit, processing unit, application specific integrated circuit, or programmable gate array, etc. Moreover, the sensor module 105, transmission module 115, and dual component locking module 120 may all be performed by a single controller 30 or divided amongst several controllers or processors.

Furthermore, the sensor module 105, transmission module 115, and dual component locking module 120 may be embodied as hardware-enabled modules and may be configured as a plurality of overlapping or independent electronic circuits and discrete elements packaged onto a circuit board to provide data and signal processing functionality within the electronic device 10. An example might be a comparator, inverter, or flip-flop, which could include a plurality of transistors and other supporting devices and circuit elements. The sensor module 105, transmission module 115, and dual component locking module 120 may contain electronic circuits that process computer logic instructions capable of providing digital and/or analog signals for performing various functions as described herein.

Figure 16:
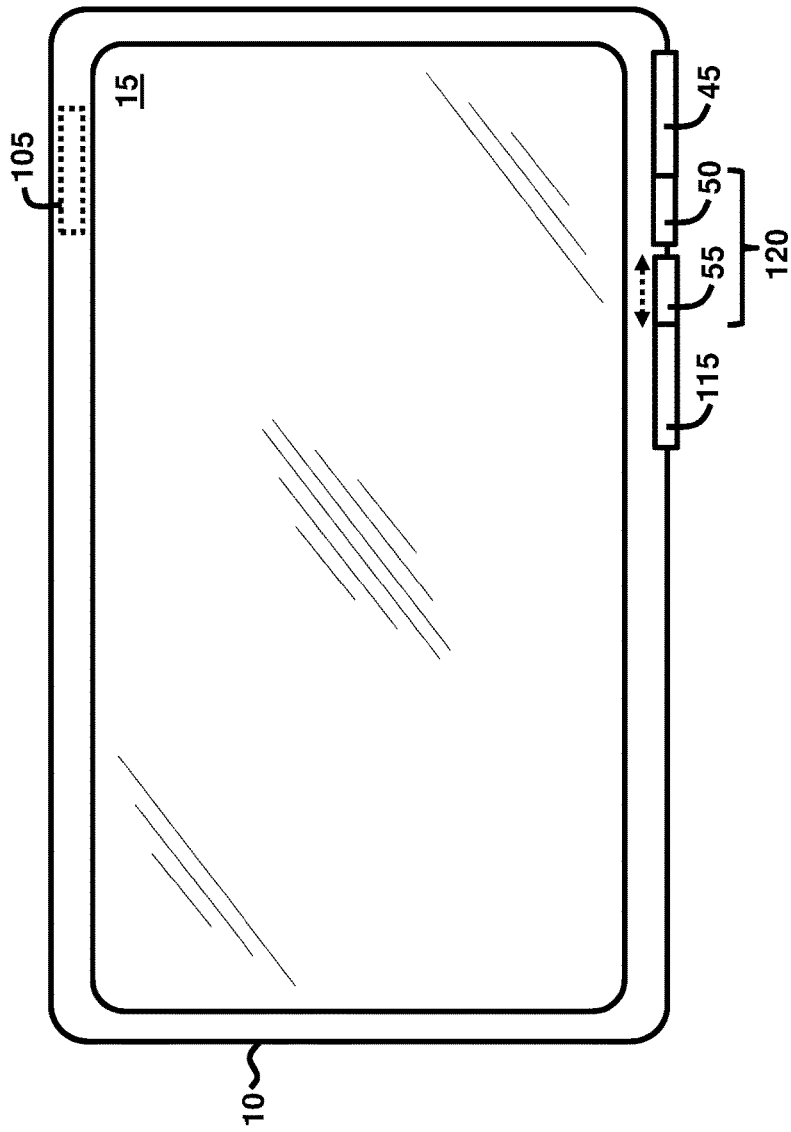
FIG. 16 is a schematic diagram illustrating a display screen of an electronic device with a sensor and locking hinge mechanism, according to an example.

As shown in FIG. 16, with reference to FIGS. 1 through 15, the electronic device 10 may comprise a laptop display screen 15 containing the sensor module 105, transmission module 115, and articulated by the hinge 45. In an example, the hinge 45 is to control vibration of the electronic device 10. In this regard, the hinge 45 comprises a suitable size, and has suitable material properties and structural capabilities to provide sufficient damping of the vibration of the electronic device 10. In an example, the dual component locking module 120 comprises a first locking mechanism 50 linearly aligned with a second locking mechanism 55. In other examples, the first locking mechanism 50 and second locking mechanism 55 are linearly aligned with the hinge 45. Furthermore, in other examples, the hinge 45, the first locking mechanism 50, and the second locking mechanism 55 are arranged in a non-linear configuration. According to an example, the connection between the first locking mechanism 50 and the second locking mechanism 55 locks the hinge 45, and the disconnection between the first locking mechanism 50 and the second locking mechanism 55 unlocks the hinge 45. While FIG. 16 depicts the hinge 45, transmission module 115, and dual component locking module 120 positioned on only one end of the electronic device 10, this merely one example, and accordingly in other examples there may be multiple sets of these components arranged on the electronic device 10.

Figure 17:
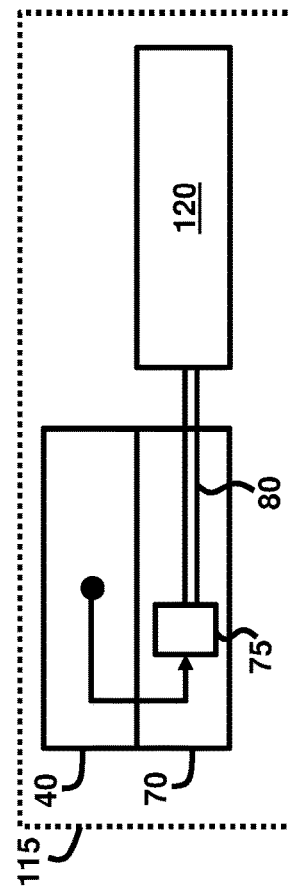
FIG. 17 is a block diagram illustrating a transmission module of the control system of FIG. 15, according to an example.

As shown in FIG. 17, with reference to FIGS. 1 through 16, the transmission module 115 comprises a motor 40, a gearbox 70 connected to the motor 40 and comprising gears 75 that are motion controlled by the motor 40; and a transmission shaft 80 to engage the dual component locking module 120 and become actuated by a motion of the gears 75. In an example, the motor 40 may be arranged in a non-linear configuration with the gearbox 70 and the dual component locking module 120. In other examples, the motor 40, gearbox 70, transmission shaft 80, and the dual component locking module 120 may be arranged in a linear configuration. The particular configuration of the transmission module 115 may be a function of the size requirements and space availability provided by the electronic device 10.

According to various examples, an electronic device 10 with a dual component locking module 120 containing a first locking mechanism 50 and a second locking mechanism 55 to enable locking or unlocking of a hinge 45 to permit controlled rotation of a display screen 15 and to control vibration of the display screen 15. A first sensor 20 is provided to detect the presence of a force or object; e.g., a user's hand 95, etc., which initiates the movement of the second locking mechanism 55 and controls the locking or unlocking of the hinge 45.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device comprising:
   a display screen;
   a first sensor on the display screen to transmit a first signal upon being contacted;
   a controller to receive the first signal and transmit a second signal in response to receiving the first signal;
   a motor to receive the second signal to trigger an actuation motion;
   a hinge connected to the display screen and comprising a first locking mechanism;
   a second locking mechanism aligned with the first locking mechanism; and
   a gearbox connected to the motor, wherein the gearbox comprises gears to rotate a shaft causing the second locking mechanism to translate with respect to the motor,
   wherein the second locking mechanism is triggered by the actuation motion of the motor, and
   wherein the triggering of the second locking mechanism is to activate the first locking mechanism to control movement of the hinge and the display screen.

2. The electronic device of claim 1, comprising a second sensor on the display screen to detect a position of the display screen, and transmit a third signal to the controller to control the actuation motion of the motor.

3. The electronic device of claim 1, wherein the actuation motion of the motor is to trigger the second locking mechanism to move linearly towards the first locking mechanism to lock the hinge.

4. The electronic device of claim 1, wherein the actuation motion of the motor is to trigger the second locking mechanism to move linearly away from the first locking mechanism to unlock the hinge.

5. The electronic device of claim 1, wherein the motor, the gearbox, the shaft, the first locking mechanism, the second locking mechanism, and the hinge are linearly aligned.

6. The electronic device of claim 1, wherein the shaft is operatively connected to the gears and the second locking mechanism, wherein upon the shaft being actuated by movement of the gears, the shaft is to trigger translational motion of the second locking mechanism with respect to the motor.

7. The electronic device of claim 1, comprising an antenna operatively connected to the first sensor.

8. An electronic device comprising:
a display screen;
a sensor on the display screen to detect a contact force upon the sensor;
a controller communicatively linked to the sensor to transmit a signal upon determining that the sensor detects the contact force;
a motor communicatively linked to the controller to move upon receiving the signal;
a hinge connected to the display screen;
a first locking mechanism to control a movement of the hinge; and
a second locking mechanism to engage the first locking mechanism upon being triggered by a motion of the motor,
wherein the engagement of the second locking mechanism with the first locking mechanism is to trigger the first locking mechanism to lock the hinge, and
wherein the first locking mechanism is to control the movement of the hinge by permitting the hinge to rotate upon the second locking mechanism disconnecting from the first locking mechanism.

9. The electronic device of claim 8, wherein the first locking mechanism is to control the movement of the hinge by retaining the hinge in place upon the second locking mechanism being connected to the first locking mechanism.

10. The electronic device of claim 8, wherein the contact force is to occur for approximately one second to trigger the controller to determine that the sensor has detected the contact force.

11. The electronic device of claim 8, wherein the first locking mechanism is fixed with respect to the hinge, and wherein the second locking mechanism is movable.

12. The electronic device of claim 8, wherein the contact force is to occur for a duration to trigger the controller to determine that the sensor has detected the contact force.

13. A control system comprising:
a sensor module to detect a position of an electronic device, and to transmit a signal upon being contacted;
a controller to receive the signal and initiate motion control of the electronic device;
a transmission module to receive motion control instructions from the controller and become actuated;
a hinge connected to the electronic device to allow the electronic device to articulate between different angles; and
a dual component locking module operatively connected to the transmission module and the hinge,
wherein the dual component locking module is to lock or unlock the hinge to control articulation of the electronic device, and
wherein the transmission module comprises:
a motor;
a gearbox connected to the motor and comprising gears that are motion controlled by the motor; and
a transmission shaft to engage the dual component locking module and become actuated by a motion of the gears.

14. The control system of claim 13, wherein the electronic device comprises a laptop display screen containing the sensor module and articulated by the hinge.

15. The control system of claim 13, wherein the hinge is to control vibration of the electronic device.

16. The control system of claim 13, wherein the dual component locking module comprises a first locking mechanism linearly aligned with a second locking mechanism.

17. The control system of claim 16, wherein a connection between the first locking mechanism and the second locking mechanism is to lock the hinge, and wherein a disconnection between the first locking mechanism and the second locking mechanism is to unlock the hinge.

18. The control system of claim 13, wherein the motor is arranged in a non-linear configuration with the gearbox and the dual component locking module.

19. The control system of claim 13, wherein the first locking mechanism and the second locking mechanism are linearly aligned with the hinge.

20. The control system of claim 13, wherein the hinge, the first locking mechanism, and the second locking mechanism are arranged in a non-linear configuration.

* * * * *